United States Patent
Fatehi et al.

[19]

[11] Patent Number: 6,008,934
[45] Date of Patent: Dec. 28, 1999

[54] SHARED-PUMP MULTI-FIBER OPTICAL AMPLIFIER

[75] Inventors: Mohammad Taghi Fatehi, Middletown; Neil Jackman, Eatontown; Andrew Jozan, Creamridge; Virginia Laura Nichols, Aberdeen; Sunita H. Patel, Marlboro; Mario Alberto Restrepo, Ocean; Ravindra K. Vora, Freehold, all of N.J.

[73] Assignee: Lucent Technologies Inc., Murray Hill, N.J.

[21] Appl. No.: 08/966,423

[22] Filed: Nov. 7, 1997

[51] Int. Cl.$^6$ ................................. H01J 3/30; G02B 6/26

[52] U.S. Cl. ........................ 359/341; 359/176; 359/345; 385/17; 385/48

[58] Field of Search ...................... 359/160, 176, 359/341, 345; 385/17, 48

[56] References Cited

U.S. PATENT DOCUMENTS

| | | | |
|---|---|---|---|
| 5,241,414 | 8/1993 | Giles et al. | 359/341 |
| 5,299,055 | 3/1994 | Yoneyama | 359/341 |
| 5,321,707 | 6/1994 | Huber | 385/142 |
| 5,513,029 | 4/1996 | Roberts | 359/177 |
| 5,654,816 | 8/1997 | Fishman | 359/117 |
| 5,689,594 | 11/1997 | Mao | 385/24 |
| 5,815,613 | 12/1998 | Fatehi et al. | 359/341 |

FOREIGN PATENT DOCUMENTS

WO92/05642   4/1992   WIPO ................... H04B 10/12

*Primary Examiner*—Nelson Moskowitz
*Attorney, Agent, or Firm*—Frederick B. Luludis; Gregory J. Murgia

[57] ABSTRACT

The subject matter is directed to a parallel array of optical amplifiers and is also directed to equally sharing the optical power supplied by a plurality of optical pumps among the array of optical amplifiers such that if one of the pumps fails the power outputted by the remaining pumps is still equally shared among the array of optical amplifiers.

9 Claims, 1 Drawing Sheet

6,008,934

1

SHARED-PUMP MULTI-FIBER OPTICAL AMPLIFIER

TECHNICAL FIELD

This invention relates to amplifiers and, more particularly, to multi-fiber optical amplifiers for use in multi-wavelength optical network elements.

BACKGROUND OF THE INVENTION

Various "dense wavelength-division multiplexing" (DWDM) solutions presently studied for the relief of capacity limitations in optical fiber communications systems include network elements with optical amplifiers for multiple-wavelength optical signals. Access to the DWDM system is provided at points where a single constituent wavelength is added to, or dropped from the DWDM path. A major obstacle in the way of implementing cost-effective add/drop access to individual wavelengths of the DWDM signal path has been the high cost of the optical amplifiers required on each single-wavelength input. In addition, the physical space and electrical power required by the optical amplifiers made it impossible to provide the number of single-wavelength inputs on one circuit pack that would be necessary to offer access to any one of N wavelength positions in a multi-wavelength input amplifier pack, where N>1.

In Multi-wavelength Optical NETworks (MONET), per-wavelength constituent signals are cross-connected or locally accessed (add/drop). In the case of the composite multi-wavelength signals, high power optical amplifiers are typically used at each input and output of the system to boost the signal powers to the required value. In the case of the multiple single-wavelength access, multiple amplifiers would be required to individually boost each single wavelength signal level. This renders the system too costly.

Additionally, all optical communications systems including amplifiers or network elements, require that all signals entering and leaving the system be monitored for integrity. This helps in fault detection and localization of a detected fault. There are various techniques for performance monitoring (see for example, U.S. Pat. No. 5,317,439 issued May 31, 1994), but all require monitoring the integrity of the incoming and outgoing signals.

SUMMARY OF THE INVENTION

The problems relating to use of multiple single wavelength optical amplifiers in prior optical switching networks is overcome by employing an optical amplifier that simultaneously amplifies a plurality of single wavelength signals. This simultaneous amplification is realized by employing at least one pump to energize a larger number of optical fiber amplifier. In a specific embodiment, at least two pumps are used to pump the optical amplifier lasers by adding the energy of the at least two pumps without additional components and then dividing the energy in a way that supplies the optical pump power to at least 2 groups of optical amplifiers.

The problems and limitations of prior performance monitoring arrangements are overcome in a cost efficient manner by utilizing optical isolators with internal taps to tap off samples of incoming input signals for monitoring purposes. This eliminates the requirement of additional optical couplers at the inputs which also leads to increased cost as well as loss and, more importantly, signal-to-noise degradation in the amplifiers. Similarly, output monitoring is realized in a cost efficient manner by also utilizing optical isolators with internal taps to tap off samples of the outgoing signals for monitoring purposes. Again, this eliminates the requirement

2 of additional optical couplers at the outputs which would also lead to a higher cost.

BRIEF DESCRIPTION OF THE DRAWING

The FIGURE shows a multi-fiber optical amplifier arrangement incorporating an embodiment of the invention.

DETAILED DESCRIPTION

Figure 1:
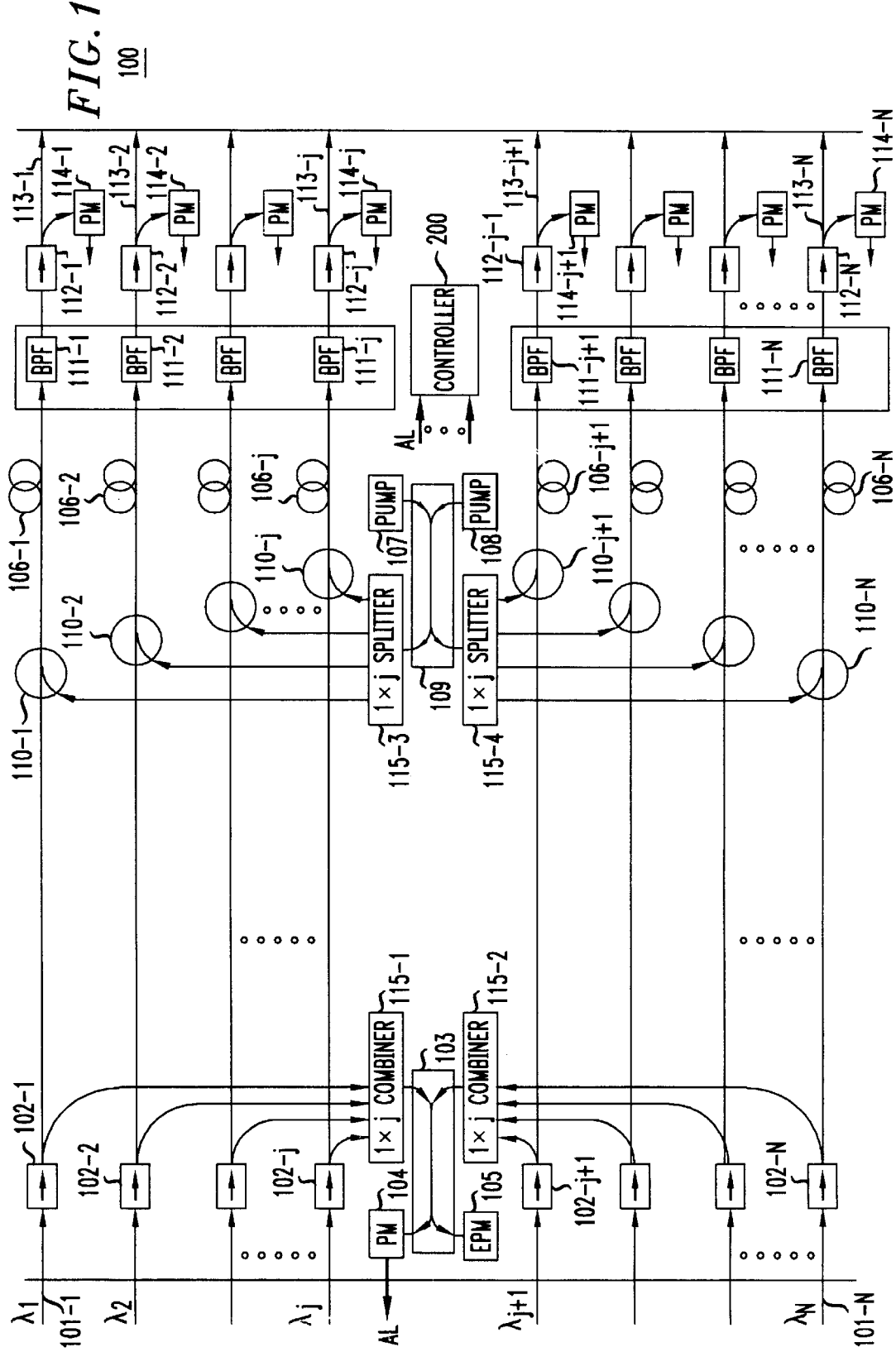

The FIGURE shows a multi-fiber optical amplifier array 100 including a plurality of individual fiber input ports 101-1 through 101-N to which single wavelength signals enter the array 100. The single wavelength signals are then supplied, on a one-to-one basis, to an equal number of optical isolators with internal taps 102-1 through 102-N. Isolators 102 are known in the art and are commercially available. It should be noted that the use of such isolators 102 with internal taps eliminates the need for additional couplers and thereby reduces the cost of the amplifier. The tapped output signals from isolators 102 are combined via a 1 by j optical combiner 115-1 and 115-2, the output of which is supplied to performance monitoring apparatus 104 and to Enhanced Performance Monitor (EPM) via output port 105. Again, couplers similar to 103 are known in the art and commercially available. Performance monitoring is also known in the art, one such arrangement being described in the U.S. Pat. No. 5,317,439, noted above, which is hereby incorporated fully by reference. Monitor 104, more particularly, detects for the presence of all of the incoming signals, e.g., $\lambda_1$ through $\lambda_N$. If all of such signals are not present, then performance monitor 104 notifies controller 200 via lead AL.

The Enhanced Performance Monitor 105 measures the power level, wavelength registration as well other optical signal characteristics for each of the incoming wavelengths, $\lambda_1$ through $\lambda_N$.

Continuing, an output from each of the isolators 102-1 through 102-N is supplied on a one-to-one basis to erbium-doped fiber lengths 106-1 through 106-N where they are amplified via energy coupled from pumps 107 and 108. This energy from pump lasers 107 and 108 is first combined and then divided by a conventional coupler arrangement 109. In this specific example, the combined energy is divided by 1×j splitter arrangements 115-3 and 115-4 and then respectively supplied to all erbium-doped fiber length 106-1 through 106-N, where N may have a value of, for example eight or sixteen and j may have a value of, for example, four or eight. The divided energy from the pumps and the signals from isolators 102 are respectively combined via wavelength division multiplex couplers 110-1 through 110-N and, thereafter, supplied to the erbium-doped fiber lengths 106 on a one-to-one basis. Specifically, divided energy from a pump laser excites the atoms that are in a respective erbium-doped fiber length. An incoming signal stimulates the atoms causing them to "relax" which results in the emission of a light signal. Thus, the level of an optical signal supplied by a respective isolator 102 is amplified as a result of the power pumped into a fiber 106.

There are several technical advantages resulting from this particular pump energizing arrangement. One advantage is that it uses less pumps than was previously used. Another advantage is that, by using at least two pumps, if one of those pumps fails, all of the amplifiers will continue to operate, but at a slightly degraded level. Additionally, the level of power supplied by each of the at least two pumps 107 and 108 is lower, which leads to using lower cost pumps. The output signals from erbium-doped fiber lengths (amplifiers) 106-1 through 106-N are then supplied on a one-to-one basis to tuned bandpass filters 111-1 through 111-N for the purpose of filtering out the out-of-band ASE (Amplified Spontaneous Emission) generated by the optical amplifier. That is, in the illustrative embodiment of the invention, each of the Band Pass Filters (BPF) is tuned to a specific wavelength in a multi-wavelength system, and serve a dual function; firstly, a BPF filters out ASE noise, as mentioned, and, therefore, allows amplification of the desired wavelength; and secondly, each device is tuned to selectively pass a target wavelength (while rejecting all other wavelengths) in a multi-wavelength system. (Note, that such tuning prevents signals of incorrect wavelengths from entering the system.)

As a result of tuning each filter to a specific wavelength, $\lambda_i$ (where i=1,2,3,4, . . . N), the corresponding input line, 101-i, will be associated with that wavelength. In this way, the system may be easily reconfigured by merely retuning a BPF to one of the other wavelength, $\lambda_1$ through $\lambda_N$.

The filtered outputs from filters 111-1 through 111-N are supplied to isolators with internal taps 112-1 through 112-N on a one-to-one basis. The main signal at the output of one of the isolator 112s is supplied to one of the output ports 113-1 through 113-N. The associated tapped signal that is supplied to the performance monitoring apparatus 114-1 through 114-N provide a measure of the level of the output power at the output of the associated outgoing port 113-i (where i=1 . . . N).

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. A multi-fiber optical amplifier array comprising
   a plurality of parallel amplifying elements
   a plurality of input ports for respectively receiving a plurality of optical signals each having a respective wavelength, and for supplying the received optical signals to respective ones of the amplifying elements,
   a plurality of optical pump sources,
   a coupler for combining the power of the optical pump sources and dividing the combined power among the parallel amplifying elements, and
   a plurality of isolators connected between respective pairs of said input ports and amplifying elements, each of said isolators having a tap for supplying a portion of the received optical signal to an input of a combiner, said combiner combining each said portional optical signal supplied from each of said isolators, and
   a performance monitor for receiving the combined signal from the combiner and determining, from the combined signal if each of said optical signals is present and notifying a controller of the result of the determination.

2. A multi-fiber optical amplifier array comprising
   a plurality of parallel amplifying elements
   a plurality of input ports for respectively receiving a plurality of optical signals each having a respective wavelength, and for supplying the received optical signals to respective ones of the amplifying elements,
   a plurality of optical pump sources,
   a coupler for combining the power of the optical pump sources and dividing the combined power among the parallel amplifying elements, and
   a plurality of isolators connected between respective pairs of said input ports and amplifying elements, each of said isolators having a tap for supplying a portion of the received optical signal to an input of a combiner, said combiner combining each said portional optical signal from each of said isolators, and
   a performance monitor for receiving the combined signal from the combiner and determining from the combined signal a plurality of optical characteristics, including power level and wavelength registration for each of the incoming optical signals.

3. The amplifier array of claim 1 further comprising
   a plurality of output ports for outputting to respective optical transmission lines the optical signals amplified by respective ones of the amplifying elements, and
   a plurality of output performance monitors each operative for measuring the power level of the optical signal outputted by a respective one of the output ports.

4. The amplifier array of claim 4 further comprising
   a plurality of tunable bandpass filters each disposed between respective pairs of the amplifier elements and output ports, each of said tunable bandpass filters being operative for filtering an optical signal received from a respective one of the amplifying elements to improve at least the signal-to-noise ratio associated with the filtered signal.

5. The amplifier array of claim 1 wherein each of the amplifying elements is an erbium doped fiber.

6. A multi-fiber optical amplifier array comprising
   a plurality of parallel amplifying elements,
   a plurality of input ports for respectively receiving a plurality of optical signals having respective wavelengths, and for supplying the received optical signals to respective ones of the amplifying elements,
   a plurality of optical pump sources,
   a coupler for combining the power of the optical pump sources and dividing the combined power among the parallel amplifying elements, and
   a plurality of band-pass filters each tuned to a respective one of the wavelengths for receiving an optical signal from a respective one of the amplifying elements and outputting a filtered optical signal to an output port, wherein each of the band-pass filters is tunable to any one of the wavelengths so that each of the plurality of optical signals having a respective wavelength can be supplied to any of the plurality of input ports.

7. A parallel array of optical amplifiers each comprising
   an input port for receiving an optical signal having a unique wavelength, and
   an amplifying element for amplifying the received optical signal in accordance with a predetermined level of power that is supplied by a shared plurality of optical pumps whose output power is combined and then divided among each said amplifying element in said array,
   a plurality of isolators connected between respective pairs of said input ports and amplifying elements, each of said plurality of isolators having a tap for supplying a portion of the received optical signal to an input of a combiner, said combiner combining each said portional optical signal supplied from each of said plurality of isolators, and
   a performance monitor for receiving the combined signal from the combiner and determining from the combined signal at least one of a plurality of optical characteristics.

8. The parallel array of claim 7 wherein the performance monitor determines, from the combined signal, the presence of each of said optical signals and notifies a controller of the result of the determination.

9. The parallel array of claim 7 wherein the plurality of optical characteristics include power level and wavelength registration for each of the incoming optical signals.

* * * * *

UNITED STATES PATENT AND TRADEMARK OFFICE
CERTIFICATE OF CORRECTION

PATENT NO. : 6,008,934
DATED : December 28, 1999
INVENTOR(S) : Mohammad Taghi Fatehi, et al., It is certified that error appears in the above-indentified patent and that said Letters Patent is hereby corrected as shown below:

Column 1, after the title and before "TECHNICAL FIELD", insert the following paragraph:

--GOVERNMENT RIGHTS
This invention was made with Government support under Agreement No. MDA 972-95-3-0027 awarded by ARPA. The Government has certain rights in the invention.--.

Signed and Sealed this

Third Day of April, 2001

Attest:

NICHOLAS P. GODICI

*Attesting Officer*      *Acting Director of the United States Patent and Trademark Office*

UNITED STATES PATENT AND TRADEMARK OFFICE
CERTIFICATE OF CORRECTION

PATENT NO. : 6,008,934
DATED : December 28, 1999
INVENTOR(S) : Mohammad Taghi Fatehi, Neil Jackman, Andrew Jozan, Virginia Laura Nichols, Sunita H. Patel, Mario Alberto Restrepo, Ravindra K. Vora It is certified that error appears in the above-identified patent and that said Letters Patent is hereby corrected as shown below:

Please add the following as the first paragraph to the Specification in the above-identified Letters Patent, as follows:

ACKNOWLEDGEMENT OF GOVERNMENTAL RIGHTS

This invention was made with Government support under Agreement No. MDA 972-94-3-0036 awarded by ARPA. The Government has certain rights in the invention.

Signed and Sealed this

Ninth Day of October, 2001

*Attest:*

NICHOLAS P. GODICI
*Attesting Officer*     *Acting Director of the United States Patent and Trademark Office*